(12) United States Patent
Harris (10) Patent No.: US 12,029,318 B2
(45) Date of Patent: Jul. 9, 2024

(54) HEADREST FOR A PROCEDURE CHAIR AND PROCEDURE CHAIR HAVING A HEADREST

(71) Applicant: Entellus Medical, Inc., Plymouth, MN (US)

(72) Inventor: Chad Harris, Maple Grove, MN (US)

(73) Assignee: Entellus Medical, Inc., Maple Grove, MN (US)

( * ) Notice: Subject to any disclaimer, the term of this patent is extended or adjusted under 35 U.S.C. 154(b) by 188 days.

(21) Appl. No.: 17/764,474

(22) PCT Filed: Oct. 7, 2020

(86) PCT No.: PCT/US2020/054565
§ 371 (c)(1),
(2) Date: Mar. 28, 2022

(87) PCT Pub. No.: WO2021/071939
PCT Pub. Date: Apr. 15, 2021

(65) Prior Publication Data
US 2022/0338633 A1    Oct. 27, 2022

Related U.S. Application Data

(60) Provisional application No. 62/912,139, filed on Oct. 8, 2019.

(51) Int. Cl.
*A47C 1/00* (2006.01)
*A47C 7/38* (2006.01)
*F16M 13/02* (2006.01)

(52) U.S. Cl.
CPC .............. *A47C 1/00* (2013.01); *A47C 7/38* (2013.01); *F16M 13/022* (2013.01); *F16M 2200/06* (2013.01)

(58) Field of Classification Search
CPC .......... A47C 1/00; A47C 7/38; F16M 13/022; F16M 2200/06
See application file for complete search history.

(56) References Cited

U.S. PATENT DOCUMENTS

| | | | |
|---|---|---|---|
| 4,465,069 A | 8/1984 | Barbier et al. | |
| 5,006,122 A | 4/1991 | Wyatt et al. | |
| 5,276,927 A * | 1/1994 | Day | A61B 90/14 5/601 |
| 6,199,233 B1 * | 3/2001 | Kantrowitz | A61B 6/0421 5/601 |

(Continued)

OTHER PUBLICATIONS

International Search Report mailed on Feb. 1, 2021, issued in connection with International Application No. PCT/US2020/054565, filed on Oct. 7, 2020, 3 pages.

(Continued)

*Primary Examiner* — Philip F Gabler
(74) *Attorney, Agent, or Firm* — McDonnell Boehnen Hulbert & Berghoff LLP (57) ABSTRACT

In an example, a headrest for a procedure chair includes a headrest backing, a cushion coupled to the headrest backing, a rail coupled to the headrest backing and configured to support a diagnostic device, and an adapter coupled to the headrest backing and configured to couple to a procedure chair. At least one component chosen from the rail and the adapter is formed from an austenitic stainless steel material.

24 Claims, 5 Drawing Sheets

(56) References Cited

U.S. PATENT DOCUMENTS

| | | | | |
|---|---|---|---|---|
| 7,178,874 B2 * | 2/2007 | Demski | ................... | A47C 7/38 |
| | | | | 297/391 |
| 7,736,056 B2 * | 6/2010 | Tybinkowski | ......... | A61B 6/035 |
| | | | | 378/208 |
| 9,161,875 B2 * | 10/2015 | Clark | ................... | A61G 13/125 |
| 10,959,677 B2 | 3/2021 | Salazar et al. | | |
| 2015/0151137 A1 | 6/2015 | Hynninen et al. | | |
| 2016/0015588 A1 * | 1/2016 | Tamiya | ................. | A61B 90/14 |
| | | | | 128/845 |
| 2016/0317103 A1 * | 11/2016 | Yakacki | ............... | A61B 6/0421 |
| 2018/0271285 A1 * | 9/2018 | Park | .................... | A61B 5/6891 |

OTHER PUBLICATIONS

Written Opinion mailed on Feb. 1, 2021, issued in connection with International Application No. PCT/US2020/054565, filed on Oct. 7, 2020, 5 pages.

\* cited by examiner

HEADREST FOR A PROCEDURE CHAIR AND PROCEDURE CHAIR HAVING A HEADREST

CROSS-REFERENCE TO RELATED APPLICATIONS

The present application is the US national phase under 35 U.S.C. § 371 of International Application No. PCT/US2020/054565, filed Oct. 7, 2020, which claims the benefit of priority to U.S. Provisional Patent Application No. 62/912,139, filed on Oct. 8, 2019, the contents of which are hereby incorporated by reference in their entirety.

FIELD

The present disclosure generally relates to procedure chairs and, more specifically, to procedure chairs having a headrest that facilitates using an electromagnetic navigation system during a medical procedure.

BACKGROUND

During some surgical procedures, a medical practitioner (e.g., an Ear, Nose, and Throat (ENT) physician) may guide a surgical instrument to a target site of a patient using a navigation system. The navigation system may include a field generator that generates an electromagnetic field and a sensor that is arranged on the surgical instrument to detect the electromagnetic field. A display of the navigation system allows the physician to determine the position of the surgical instrument within the patient.

SUMMARY

In an example, a headrest for a procedure chair includes a headrest backing, a cushion coupled to the headrest backing, a rail coupled to the headrest backing and configured to support a diagnostic device, and an adapter coupled to the headrest backing and configured to couple to a procedure chair. At least one component chosen from the rail and the adapter is formed from an austenitic stainless steel material.

In another example, a procedure chair includes a backrest, an adapter that extends from a top of the backrest, and a headrest coupled to the adapter. The headrest includes a headrest backing, a cushion coupled to the headrest backing, and a rail coupled to the headrest backing and configured to support a diagnostic device. At least one component chosen from the rail and the adapter is formed from an austenitic stainless steel material.

In another example, a headrest includes a headrest backing, a cushion coupled to the headrest backing, a rail coupled to the headrest backing and configured to support a diagnostic device, and an adapter coupled to the headrest backing and configured to couple to a procedure chair.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As described above, during some surgical procedures, a surgical instrument can be guided to a target site of a patient using a navigation system. The navigation system can include a field generator that generates an electromagnetic field, a sensor that is arranged on the surgical instrument to detect the electromagnetic field, and a display that facilitates determining the position of the surgical instrument within the patient.

During some surgical procedures, the patient may be seated in a procedure chair, and a headrest of the procedure chair may support the patient's head. In such procedures, the physician generally attempts to position the field generator of the navigation system beside the patient's head in such a way as to optimize the performance of the navigation system. Unfortunately, the headrest of a typical procedure chair can interfere with the electromagnetic field generated by the field generator. This interference, in turn, can degrade the performance of the navigation system.

Within examples, the present disclosure describes systems and methods that can address one or more of the challenges described above. For instance, within examples, the present disclosure provides for a headrest having components formed from materials that exhibit negligible effects on an electromagnetic field generated by a field generator. More specifically, the components of the headrest can be formed from materials that do not materially affect the accuracy of a navigation system sensing a location of a sensor on a surgical instrument responsive to the electromagnetic field generated by the field generator. As an example, one or more components of the headrest can be formed from an austenitic stainless steel material, which can provide relatively high strength for supporting a patient's head in a desired position while mitigating electromagnetic interference during operation of the field generator. The austenitic stainless steel material may also be annealed, which can further mitigate electromagnetic interference. In another example, the one or more components of the headrest can be formed from another electromagnetically non-disruptive material such as, for instance, one or more non-ferrous metals.

The headrest also includes one or more rails that are configured to couple the field generator to the headrest. In an example, the rail(s) can each have a respective longitudinal axis that provides a plurality of positions at which the field generator can be coupled. This can allow the diagnostic device to be selectively positioned along the rail based on a location of an anatomy of the patient to be targeted by a medical procedure, which can additionally or alternatively help to improve an accuracy of sensor measurements by the navigation system.

Figure 1A:
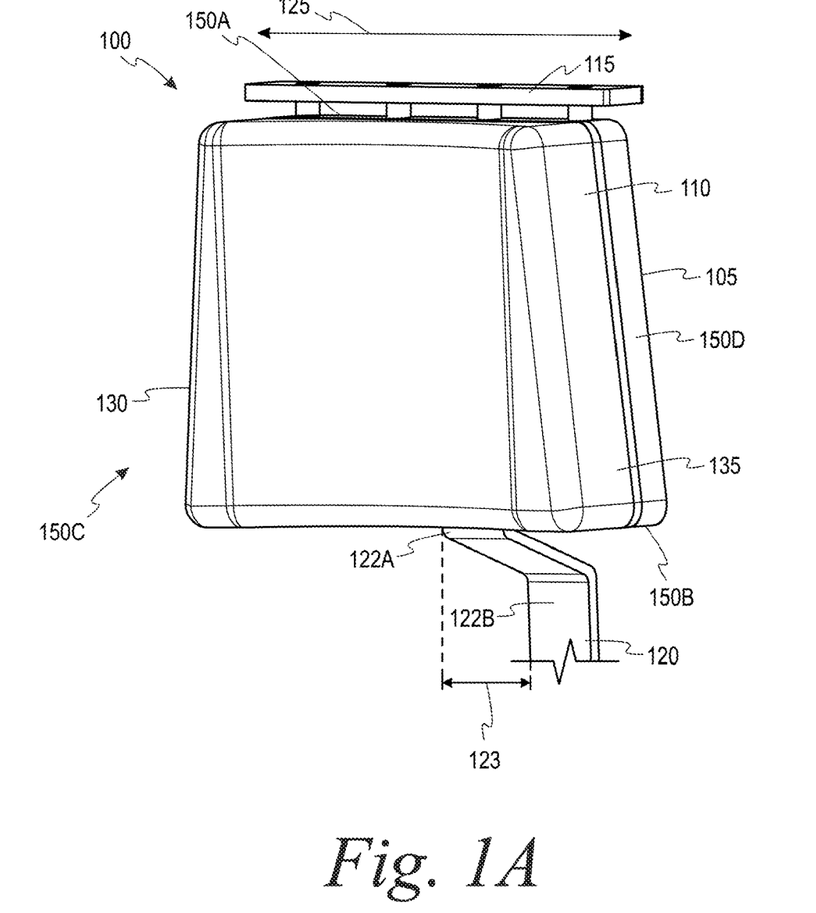
FIG. 1A illustrates a headrest, according to an example.
Figure 1B:
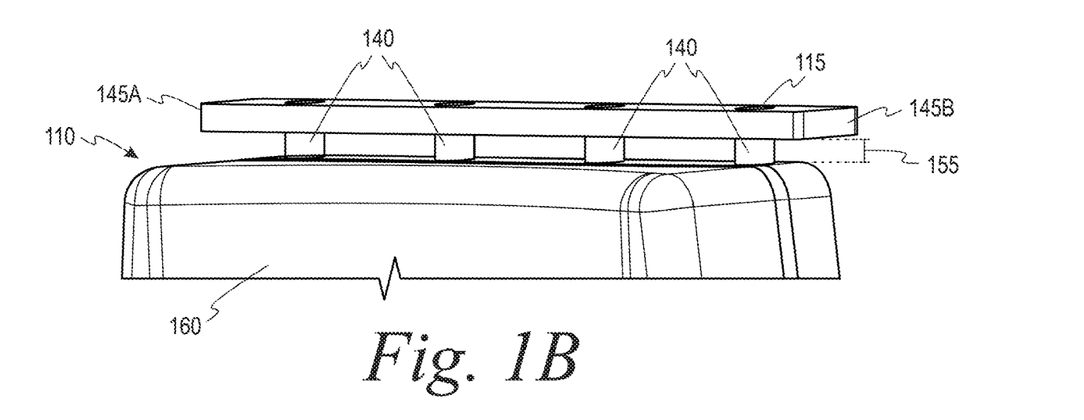
FIG. 1B illustrates a rail of the headrest shown in FIG. 1A, according to an example.

FIG. 1A illustrates a headrest 100 according to an example. As shown in FIG. 1A, the headrest 100 includes a headrest backing 105, a cushion 110, a rail 115, and an adapter 120. FIG. 1B illustrates the rail 115 of the headrest shown in FIG. 1A, according to an example.

The headrest backing 105 can be a rigid support structure that can, among other things, support a patient's head when the patient is seated in a procedure chair to which the headrest 100 is coupled. For instance, to support the patient's head, the headrest backing 105 can be formed from a material having a durometer between approximately 40 Shore D and approximately 100 Shore D. As examples, the headrest backing 105 can be formed from a material chosen from a plastic material and a wood material. Additionally, for instance, to support the patient's head, the headrest backing 105 can have a surface area between approximately 60 square inches ($in^2$) and approximately 240 $in^2$. In another example, the headrest backing 105 can have a surface area between approximately 60 $in^2$ to approximately 500 $in^2$.

In FIG. 1A, the headrest backing 105 has a quadrilateral shape. In particular, the headrest backing 105 includes a top side 150A, a bottom side 150B, a first lateral side 150C, and a second lateral side 150D. The top side 150A is configured to be closer to a top of a patient's head than the bottom side 150B when a back of the patient's head rests against the headrest 100. The first lateral side 150C and the second lateral side 150D each extend (i) between the top side 150A and the bottom side 150B and (ii) on opposing sides of the headrest backing 105. As such, the first lateral side 150C is configured to be closer to a right sagittal half of the patient's head, and the second lateral side 150D is configured to be closer to a left sagittal half of the patient's head when a back of the patient's head rests against the headrest 100.

In FIG. 1A, the headrest backing 105 defines a generally trapezoidal shape in which the top side 150A has a length in a direction that is parallel to a longitudinal axis 125 of the rail 115 that is shorter than a length of the bottom side 150B along the same direction. This trapezoidal shape of the headrest backing 105 can help to balance patient comfort and cost efficiencies. However, in other examples, the headrest backing 105 can a different shape and/or a different size. For instance, the headrest backing 105 can have a rectangular shape, a square shape, a triangular shape, a pentagonal shape, a hexagonal shape, another polygonal shape, or a non-polygonal shape.

In some examples, the headrest backing 105 can have a concave contour. This can help to maintain a patient's head in a relatively stationary position in a central region of the headrest 105. As described in further detail below, a field generator may be positioned in a selected position relative to the patient's head and, therefore, it may be desirable to maintain the patient's head in the relatively stationary position. The concave contour of the headrest backing 105 can thus help to improve sensor measure accuracy by a navigation system.

The cushion 110 is coupled to the headrest backing 105. For example, the cushion 110 can be coupled to the headrest backing 105 via one or more fasteners (e.g., at least one fastener chosen from one or more screws, one or more bolts, one or more clips, and one or more pins) and/or an adhesive. As shown in FIG. 1A, the cushion 110 can be coupled to the headrest backing 105 at a periphery of the headrest backing 105 such as, for example, at the top side 150A, the bottom side 150B, the first lateral side 150C, and the second lateral side 150D. As such, the cushion 110 can have a shape that generally corresponds to the shape of the headrest backing 105. Although the cushion 110 has a trapezoidal shape in FIG. 1A, the cushion 110 can have a rectangular shape, a square shape, a triangular shape, a pentagonal shape, a hexagonal shape, another polygonal shape, or a non-polygonal shape in other examples.

The cushion 110 can be formed from one or more materials that provide with comfortable support when the patient's head contacts and/or rests against the headrest 100. In an example, an exterior surface of the cushion 110 can be formed from a relatively soft material such as, for instance, at least one material chosen from a vinyl material, molded foam, and upholstery. The exterior surface of the cushion 110 can provide a patient-engagement surface 160 of the cushion 110, which is configured to contact the patient's head when the patient is seated in a procedure chair. Additionally, the cushion 110 can include a fill material between the exterior surface of the cushion 110 and the headrest backing 105. As examples, the fill material can include at least one material chosen from a polyethylene foam material, a memory foam material, a batting material, and a polyester material. In this way, the cushion 110 can provide a relatively softer structure for enhancing patient comfort, whereas the headrest backing 105 can provide a relatively harder structure for providing structural support to maintain the patient's head in a desired location during a medical procedure.

As shown in FIG. 1A, the headrest 100 can additionally include the adapter 120. In general, the adapter 120 can couple the headrest 100 to a procedure chair in which the patient can sit during the medical procedure. For example, in FIG. 1A, the adapter 120 can include a first end 122A that can couple to the headrest backing 105, and a second end 122B that can couple to the procedure chair. As examples, the first end 122A of the adapter 120 can couple to the headrest backing 105 by a coupling mechanism chosen from one or more non-ferrous metal screws (e.g., one or more screws formed from 303 stainless steel or 316 stainless steel) and one or more plastic screws. Also, as examples, the second end 122B of the adapter 120 can couple to the procedure chair by a coupling mechanism chosen from one or more non-ferrous metal screws (e.g., one or more screws formed from 303 stainless steel or 316 stainless steel) and one or more plastic screws.

In some examples, the adapter 120 can be removably coupled to the headrest backing 105 (e.g., at the bottom side 150B of the headrest backing 105) and/or the procedure chair. Providing a removable coupling between the adapter 120 and the headrest backing 105 can allow for the headrest 100 to be interchangeably coupled to a plurality of adapters 120 that are different from each other. For instance, the plurality of adapters 120 can each be configured to couple the headrest 100 to respective ones of a plurality of different types of procedure chairs. As an example, a first adapter 120 can be configured to couple the headrest 100 to a first type of procedure chair and a second adapter 120 can be configured to couple the headrest 100 to a second type of procedure chair. This may beneficially allow the headrest 100 to be used with a variety of different types of procedure chairs, which may be manufactured for by a plurality of different manufacturers. Additionally, this can facilitate retrofitting an existing procedure chair with the headrest 100 by using the adapter 120 corresponding to the procedure chair.

In FIG. 1A, the first end 122A of the adapter 120 is offset relative to the second end 122B by a distance 123 in a dimension that is parallel to a direction from the patient-engagement surface 160 to the headrest backing 105. This can help to aid in patient comfort and/or provide improved ergonomics. However, in other examples, the first end 122A of the adapter 120 can be coplanar with the second end 122B of the adapter 120.

As the adapter 120 couples the headrest 100 to the procedure chair, the adapter 120 can be made from a material that has a rigidity and/or a strength that is suitable to maintain the headrest backing 105 and the cushion 110 at a desired position relative to the procedure chair when a patient's head applies a force to the headrest 100. For example, the adapter 120 can be formed from a material that can support a combined weight of a patient's head, a mounting device (as described below), and a diagnostic device (e.g., a field generator) without permanently deforming.

Some types of materials that may provide the adapter 120 with sufficient strength and/or rigidity to maintain the headrest backing 105 and the cushion 110 at the desired position relative to the procedure chair may negatively impact an operation of a navigation system. In particular, some types of materials may electromagnetically interfere with a field generator during a surgical procedure. The electromagnetic interference could lead to inaccurate sensor measurements by the navigation system.

In some examples, the adapter 120 can be made from a material that exhibits negligible effects on an electromagnetic field generated by a field generator. For instance, in one example, the adapter 120 of the headrest can be formed from an austenitic stainless steel material such as, for example, 316 stainless steel. In some implementations, the austenitic stainless steel can be annealed to further reduce the electromagnetic interference that is caused by the adapter 120.

Although forming the adapter 120 from an austenitic stainless steel and/or an annealed austenitic stainless steel can provide structural and functional benefits when using the headrest 100 in connection with the field generator of a navigation system, the adapter 120 can be formed of other materials in other examples. For instance, the adapter 120 can be formed from an electromagnetically non-disruptive material chosen from a plastic material, carbon fiber, and one or more non-ferrous metals.

As described above, the headrest 100 can also include the rail 115. In FIGS. 1A-1B, the rail 115 is coupled to the top side 150A of the headrest backing 105. However, as described in further detail below, the rail 115 can be coupled to at least one side of the headrest backing 105 chosen from the top side 150A, the first lateral side 150C, and the second lateral side 150D. Accordingly, in some implementations, the headrest 100 can include a plurality of rails 115. This can help to provide a greater quantity of positions at which the field generator of a navigation system can be coupled to the headrest 100 and, thus, provide greater flexibility in positioning the field generator relative to a patient seated in a procedure chair.

As shown in FIG. 1B, the rail 115 can be coupled to the headrest backing 105 by one or more fasteners 140. As examples, the one or more fasteners 140 can include at least one fastener chosen from one or more threaded fasteners, one or more bolts, one or more quick release pins, and one or more nuts. Accordingly, the rail 115 and/or the headrest backing 105 can have features that correspond to the one or more fasteners 140 (e.g., one or more threaded bores and/or one or more apertures) to facilitate coupling the one or more fasteners 140 to the rail 115 and/or the headrest backing 105. In other examples, the one or more fasteners 140 can be integrally formed with one of the rail 115 or the headrest backing 105. In some implementations, the one or more fasteners 140 can be made from a material chosen from one or more non-ferrous metals (e.g., 303 stainless steel and 316 stainless steel) and one or more plastic materials.

Additionally, as shown in FIG. 1B, the one or more fasteners 140 include a plurality of fasteners 140 that couple the rail 115 to the headrest backing 105 at a plurality of points along a longitudinal axis 125 of the rail 115. This can help improve a strength of the coupling between the rail 115 and the headrest backing 105 and thereby improve a stability of the field generator coupled to the rail 115 relative to some implementations in which the rail 115 is coupled to the headrest backing 105 by a single fastener 140.

In addition to coupling the rail 115 to the headrest backing 105, the one or more fasteners 140 can also position the rail 115 at a distance 155 from the headrest backing 105. Coupling the rail 115 to the headrest backing 105 with the distance between the rail 115 and the headrest backing 105 can help to adjust a position of the field generator along the rail 115 and thereby improve a user experience when adjusting and/or setting a position of the field generator.

As shown in FIGS. 1A-1B, when the rail 115 is coupled to the top side 150A of the headrest backing 105, the rail 115 is positioned above the top side 150A and separated from the top side 150A by the distance 155. The rail 115 also extends between a first end 145A of the rail 115 and a second end 145B of the rail 115. The longitudinal axis 125 of the rail 115 extends in a direction between the first end 145A and the second end 145B of the rail 115. In this arrangement, the rail 115 defines a plurality of positions along the longitudinal axis 125 at which the field generator can be positioned.

In some examples, the rail 115 can be made from a material that exhibits negligible effects on an electromagnetic field generated by a field generator. For instance, in one example, the rail 115 of the headrest 100 can be formed from an austenitic stainless steel material such as, for example, 316 stainless steel. In some implementations, the austenitic stainless steel can be annealed to further reduce the electromagnetic interference that is caused by the rail 115.

Although forming the rail 115 from an austenitic stainless steel and/or an annealed austenitic stainless steel can provide structural and functional benefits when using the headrest 100 in connection with the field generator of a navigation system, the rail 115 can be formed of other materials in other examples. For instance, the rail 115 can be formed from an electromagnetically non-disruptive material chosen from a plastic material, carbon fiber, and one or more non-ferrous metals.

In one implementation, the rail 115 and the adapter 120 can be made from the austenitic stainless steel material or the annealed austenitic stainless steel material. In another implementation, one of the rail 115 and the adapter 120 is made from the austenitic stainless steel material or the annealed austenitic stainless steel material, and the other of the rail 115 and the adapter 120 is made from a different material. Thus, in examples, at least one component chosen from the rail 115 and the adapter 120 can be formed from the austenitic stainless steel material or the annealed austenitic stainless steel material.

Figure 2A:
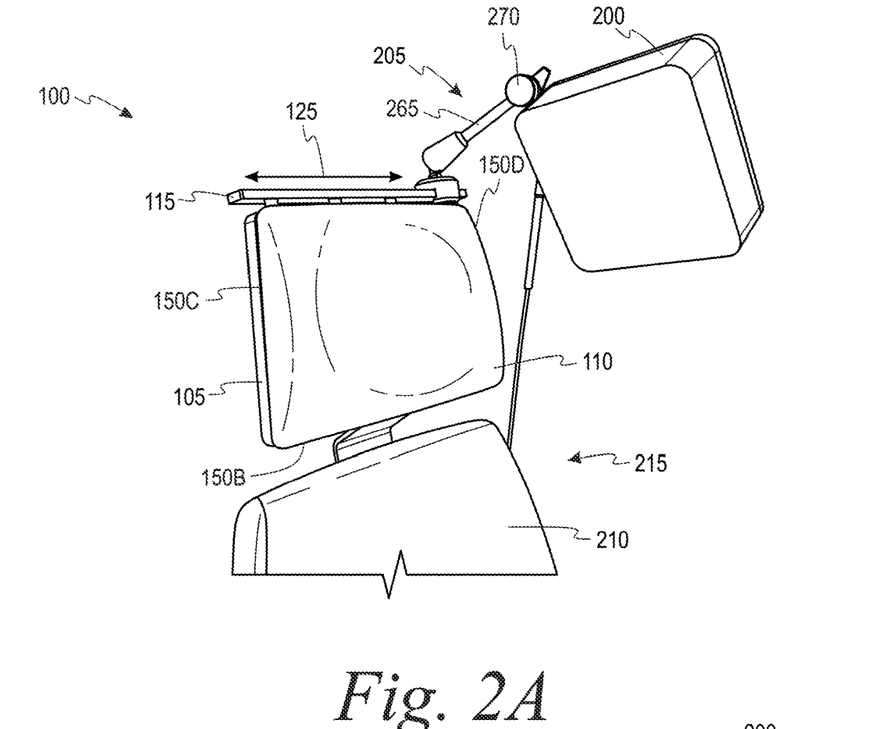
FIG. 2A illustrates a diagnostic device coupled to the headrest of FIGS. 1A-1B in a first position and a first orientation, according to an example.
Figure 2B:
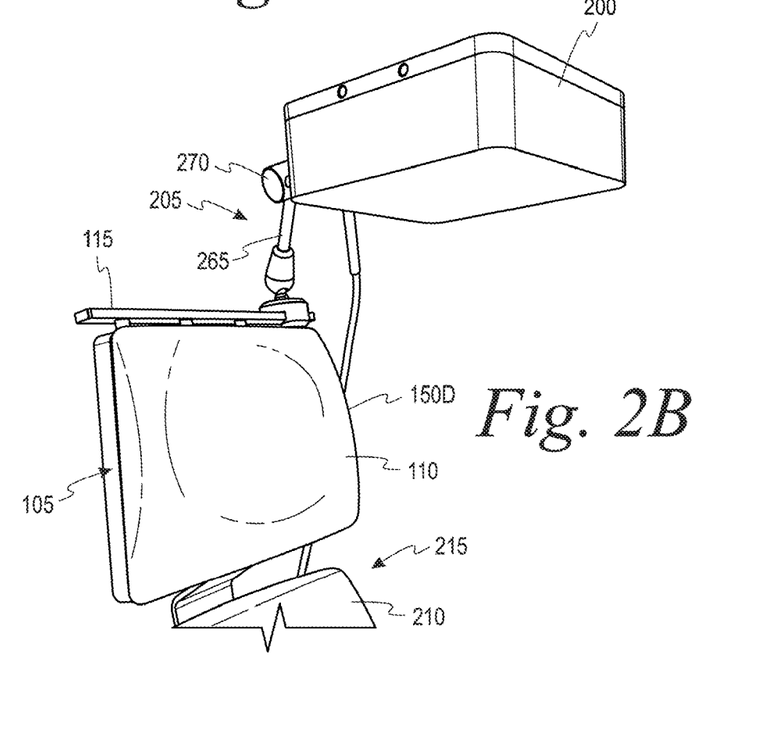
FIG. 2B illustrates the diagnostic device of FIG. 2A in the first position and a second orientation, according to an example.
Figure 2C:
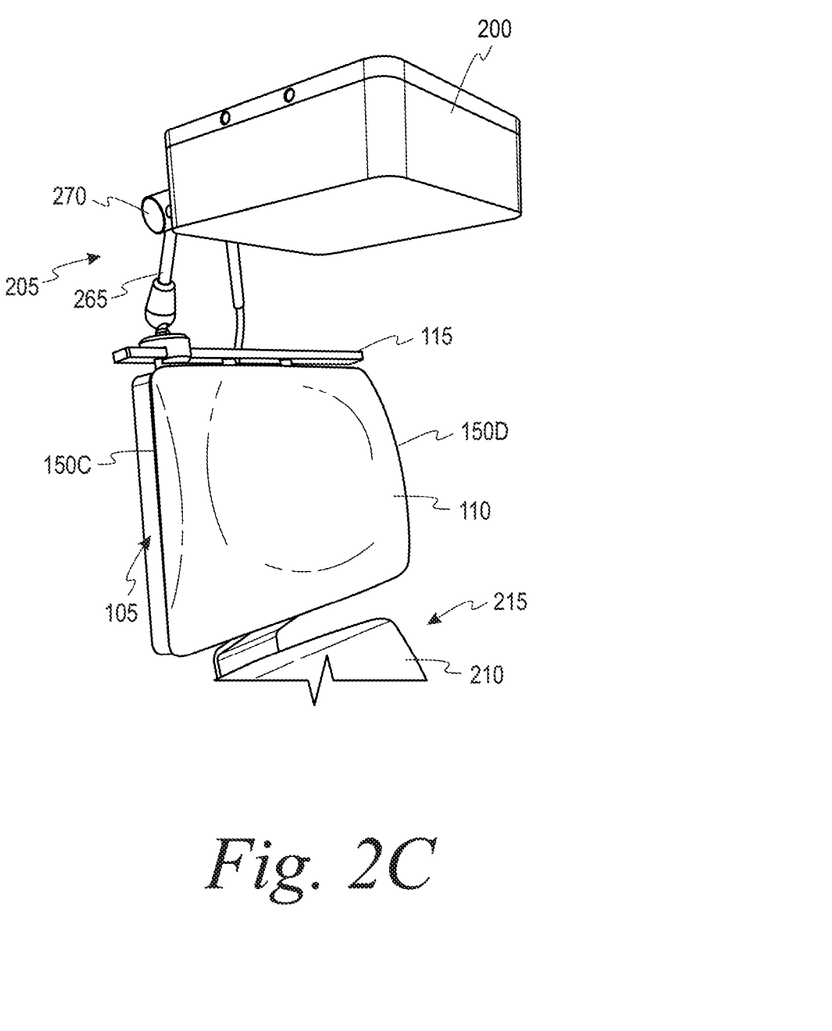
FIG. 2C illustrates the diagnostic device of FIG. 2A in a second position and the second orientation, according to an example

FIGS. 2A-2C illustrate the headrest 100 shown in FIGS. 1A-1B coupled to a procedure chair 215 and a diagnostic device 200 coupled to the rail 115 of the headrest 100. The procedure chair 215 includes a backrest 210 that is configured to support a back of a patient when the patient is seated in the procedure chair 215. The backrest 210 can include a backrest backing and a backrest cushion that are made from materials that may be similar or identical to the materials described above with respect to the headrest backing 105 and the cushion 110, respectively. As shown in FIGS. 2A-2C, the adapter 120 can extend from a top of the backrest 210 to the headrest 100.

In FIGS. 2A-2C, the diagnostic device 200 is a field generator of a navigation system. However, in other examples, the diagnostic device 200 can be a component of an endoscopic imaging system and/or a rigid fixation structure for coupling medical equipment to the headrest 100.

In this example, in which the diagnostic device 200 is the field generator of the navigation system, the diagnostic device 200 can generate an electromagnetic field. Within examples, the headrest 100 is configured to couple to the diagnostic device 200 such that a patient's head can be within the electromagnetic field generated by the diagnostic device 200 when the patient is seated in the procedure chair 215 with the patient's head adjacent to and/or supported by the headrest 100.

For instance, as shown in FIGS. 2A-2C, the headrest 100 can further include a mounting device 205 that is configured to couple the diagnostic device 200 to the rail 115 of the headrest 100. The mounting device 205 can be removably coupled to the rail 115, for example, as described below with respect to FIG. 3. More generally, the mounting device 205 is positionable at a plurality of positions along the longitudinal axis 125 of the rail 115 to facilitate positioning the diagnostic device 200 at a position selected from among a plurality of positions relative to the headrest backing 105 and/or the cushion 110. As illustrative examples, FIGS. 2A-2B depict the mounting device 205 coupling the diagnostic device 200 to a first position on the rail 115 and FIG. 2C depicts the mounting device 205 coupling the diagnostic device 200 to a second position on the rail 115. The first position and the second position illustrated in FIGS. 2A-2C are example positions for illustrative purposes, and the mounting device 205 can be coupled to the rail 115 at any position along the longitudinal axis 125 of the rail 115 in the example shown in FIGS. 2A-2C.

By providing the rail 115 at the top side 150A of the headrest backing 105, the mounting device 205 and the diagnostic device 200 can be positionable at a plurality of positions along a coronal plane of a patient's head when the patient is seated in the procedure chair 215. This can beneficially provide for positioning the diagnostic device 200 relative to the headrest backing 105 based on a specific location in the patient that is to be targeted during a medical procedure. For instance, the mounting device 205 and the diagnostic device 200 can be positioned on the rail 115 nearer to the first end 145A of the rail 115 and the first lateral side 150C of the headrest backing 105 during a medical procedure that will target anatomy on the right sagittal half of the patient's head. By contrast, the mounting device 205 and the diagnostic device 200 can be positioned on the rail 115 nearer to the second end 145B of the rail 115 and the second lateral side 150D of the headrest backing 105 during a medical procedure that will target anatomy on the left sagittal half of the patient's head. Setting and/or adjusting a position of the mounting device 205 and the diagnostic device 200 along the rail 115 based on the location of the anatomy of the patient targeted by the medical procedure can additionally or alternatively help to improve an accuracy of sensor measurements by the navigation system.

As shown in FIGS. 2A-2C, the mounting device 205 can include an articulating arm that is movable relative to the headrest backing 105 and/or the cushion 110 according to a plurality of degrees of freedom of movement. For example, the mounting device 205 can include a plurality of links 265 that are coupled to one another by one or more joints 270 to form a kinematic chain. Each joint 270 can be configured to facilitate at least one of rotational motion or translational displacement of one link 265 coupled to that joint 270 relative to another link 265. For example, the one or more joints 270 can include one or more rotational joints, linear joints, twisting joints, orthogonal joints, and/or revolving joints. As a result, the mounting device 205 can be configured to adjust a position and/or an orientation of the diagnostic device 200 with between one and six degrees of freedom (i.e., up to three degrees of freedom for translation and up to three degrees of freedom for rotation).

In one example, the articulating arm of the mounting device 205 is movable relative to the cushion 110 according to at least two degrees of freedom. In another example, the articulating arm of the mounting device 205 is movable relative to the cushion 110 according to at least three degrees of freedom. In another example, the articulating arm of the mounting device 205 is movable relative to the cushion 110 according to at least four degrees of freedom. In another example, the articulating arm of the mounting device 205 is movable relative to the cushion 110 according to at least five degrees of freedom. In another example, the articulating arm of the mounting device 205 is movable relative to the cushion 110 according to at least six degrees of freedom. In general, providing a greater quantity of degrees of freedom can provide greater flexibility to position the diagnostic device 200 in a plurality of orientations relative to the headrest backing 105.

As such, within examples, the mounting device 205 can be configured to position the diagnostic device 200 at an orientation selected from among a plurality of orientations relative to the headrest backing 105 and the cushion 110. As illustrative examples, FIG. 2A depicts the mounting device 205 positioning the diagnostic device 200 in a first orientation relative to the headrest backing 105 and the cushion 110, and FIGS. 2B-2C depict the mounting device 205 positioning the diagnostic device 200 in a second orientation relative to the headrest backing 105 and the cushion 110. In FIG. 2A, the mounting device 205 arranges the diagnostic device 200 adjacent to the second lateral side 150D such that the diagnostic device 200 faces a left sagittal half of the patient's head when the patient is seated in the procedure chair 215. Whereas, in FIG. 2B, the mounting device 205 arranges the diagnostic device 200 above the top side 150A such that the diagnostic device 200 faces a top of the patient's head when the patient is seated in the procedure chair 215. The first orientation and the second orientation illustrated in FIGS. 2A-2C are example orientations of the diagnostic device 200 for illustrative purposes, and the mounting device 205 can orient the diagnostic device 200 in a plurality of other orientations.

Because the mounting device 205 can provide for a plurality of orientations of the diagnostic device 200 relative to the headrest backing 105 and the cushion 110, the diagnostic device 200 can be orientated in manner that improves (or optimizes) a directionality of the electromagnetic field according to an anatomy of the patient that is targeted during the medical procedure. This can additionally or alternatively help to improve an accuracy of sensor measurements by the navigation system.

As noted above, the mounting device 205 can be removably coupled to the rail 115. In an example shown in FIG. 3, the mounting device 205 can include a clamp 305 that facilitates sliding the mounting device 205 along the longitudinal axis 125 (shown in FIGS. 1A and 2A) of the rail 115. The clamp 305 can define a gripping region 310 having a shape that corresponds to a shape of a cross-section of the rail 115. As examples, the shape of the gripping region 310 and the shape of the cross-section of the rail 115 can have a shape chosen from rectangular shape, a square shape, other polygonal shapes, and a non-polygonal shape. In some implementations, the shape of the gripping region 310 and the shape of the cross-section of the rail 115 can be such that the gripping region 310 is non-rotationally engaged with the rail 115 when the rail 115 is received in the gripping region 310 of the mounting device 205. This can help to control the position and/or the orientation of the diagnostic device 200 relative to the headrest backing 105 and the cushion 110.

Figure 3:
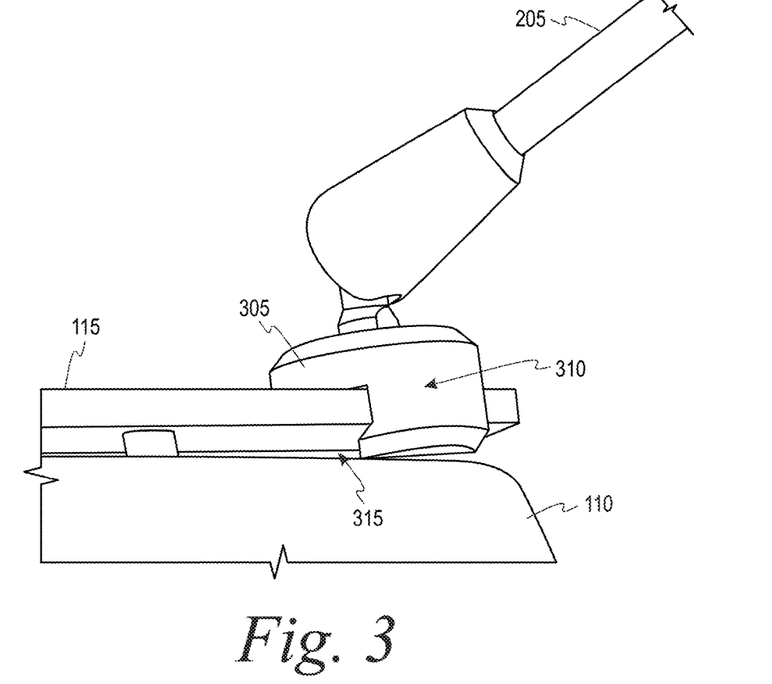
FIG. 3 illustrates a clamp of a mounting device coupling the diagnostic device of FIGS. 2A-2C to a rail of the headrest shown in FIGS. 1A-2C, according to an example.

In FIG. 3, the gripping region 310 can define an open region 315 that is aligned with a location of the fastener(s) 140 coupling the rail 115 to the headrest backing 105. In this way, the open region 315 of the gripping region 310 can facilitate sliding the clamp 305 past the fasteners 140 to set or adjust a position of the mounting device 205 along the rail 115.

As noted above, the clamp 305 can facilitate removably coupling the mounting device 205 to the rail 115. In FIG. 3, the mounting device 205 can be coupled to the rail 115 by aligning the gripping region 310 of the clamp 305 with the first end 145A or the second end 145B (shown in FIG. 1B), and then advancing the clamp 305 over the rail 115 such that the rail 115 is received in the gripping region 310 of the mounting device 205. To decouple the mounting device 205 from the rail 115, the clamp 305 can be advanced off of the first end 145A or the second end 145B of the rail 115.

Figure 4:
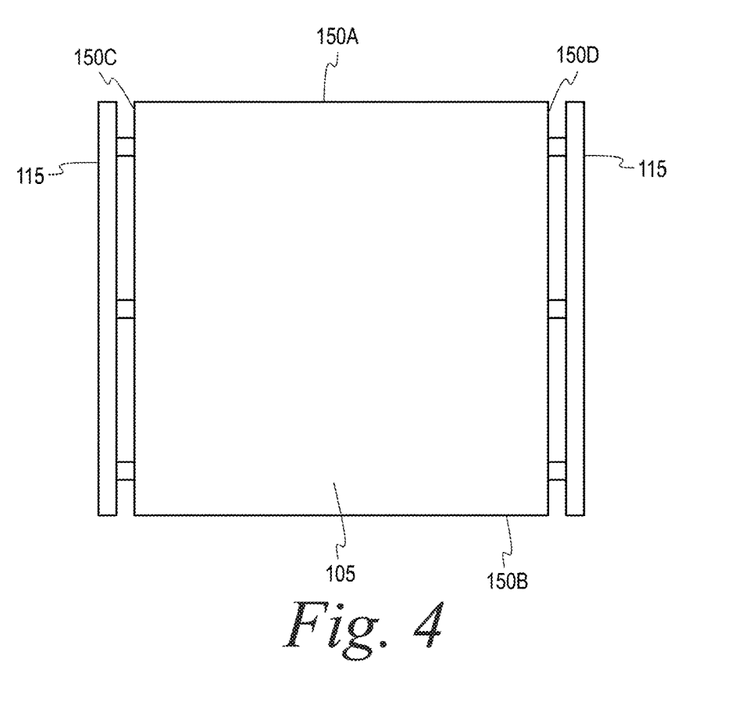
FIG. 4 illustrates a headrest including a plurality of rails, according to an example.

As described above, the headrest 100 shown in FIGS. 1A-3 includes a single rail 115 that is coupled to the top side 150A of the headrest backing 105. However, as described above, the headrest 100 can include the rail 115 coupled to at least one side chosen from the top side 150A, the first lateral side 150C, and the second lateral side 150D. FIG. 4 depicts another example in which the headrest backing 105 includes a first rail 115 coupled to the first lateral side 150C and a second rail 115 the second lateral side 150D. The first rail 115 can be coupled to and extend from the first lateral side 150C, and the second rail 115 can be coupled to and extend from the second lateral side 150D in a manner similar to that described above for the rail 115 shown in FIGS. 1A-3.

Additionally, the mounting device 205 and the diagnostic device 200 can be coupled to the first rail 115 and the second rail 115 shown in FIG. 4 in a manner similar to that described above with respect to FIGS. 2A-3.

Figure 5:
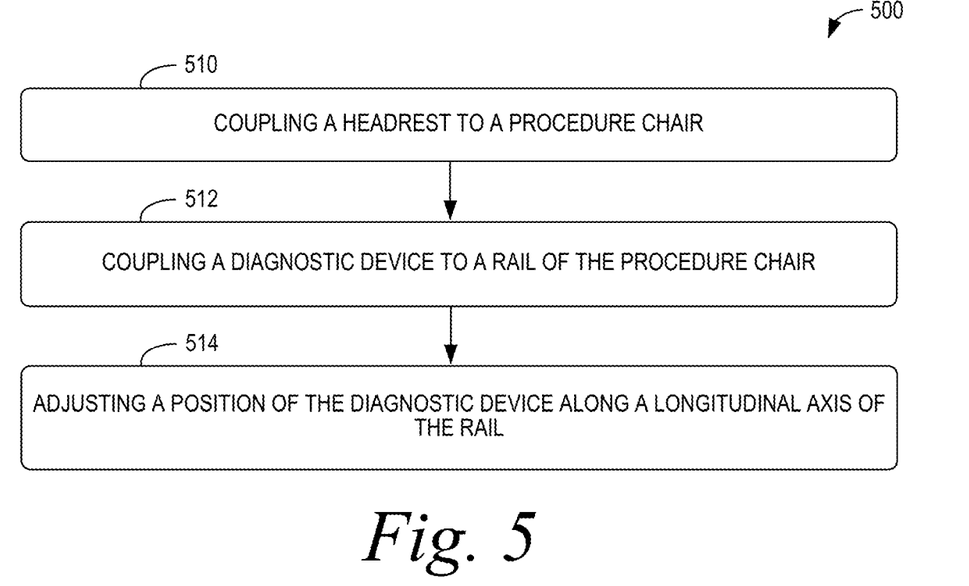
FIG. 5 illustrates a process for using a procedure chair according to an example.

Referring now to FIG. 5, a process 500 of using a procedure chair is shown according to an example. As shown in FIG. 5, at block 510, the process 500 can include coupling a headrest to a procedure chair. The headrest can include a headrest backing, a cushion coupled to the headrest backing, and a rail coupled to the headrest backing. At block 512, the process 500 can include coupling a diagnostic device to a rail of the procedure chair. At block 514, the process 500 can include adjusting a position of the diagnostic device along a longitudinal axis of the rail.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A headrest for a procedure chair, comprising:
   a headrest backing;
   a cushion coupled to the headrest backing;
   a rail coupled to the headrest backing and configured to support a diagnostic device that generates a magnetic field; and
   an adapter coupled to the headrest backing and configured to couple to a procedure chair,
   wherein at least one component chosen from the rail and the adapter is formed from an austenitic stainless steel material to mitigate electromagnetic interference with the magnetic field.

2. The headrest according to claim 1, further comprising a mounting device removably coupled to the rail, wherein the mounting device is configured to couple the diagnostic device to the rail.

3. The headrest according to claim 2, wherein the mounting device comprises an articulating arm that is movable relative to the cushion according to at least four degrees of freedom.

4. The headrest according to claim 2, wherein the mounting device is positionable at a plurality of positions along a longitudinal axis of the rail.

5. The headrest according to claim 2, wherein the mounting device comprises a clamp with a gripping region having a shape that corresponds to a shape of a cross-section of the rail.

6. The headrest according to claim 2, wherein the rail is coupled to the headrest backing via one or more fasteners arranged between a first end of the rail and a second end of the rail, wherein the one or more fasteners extend from a bottom of the rail, and wherein the mounting device includes a clamp that defines an open region that facilitates sliding the clamp longitudinally across the rail, past the one or more fasteners.

7. The headrest according to claim 1, wherein the rail is coupled to a top side of the headrest backing, wherein the top side is configured to be closer to a top of a head of a patient than a bottom side of the headrest backing when the head of the patient rests against the cushion.

8. The headrest according to claim 7, wherein the rail extends from a first lateral side of the headrest backing to a second lateral side of the headrest backing.

9. The headrest according to claim 1, wherein the adapter is removable from the procedure chair.

10. The headrest according to claim 1, wherein the austenitic stainless steel material is annealed.

11. The headrest according to claim 1, wherein the rail is formed from the austenitic stainless steel material.

12. The headrest according to claim 1, wherein the rail and the adapter are formed from the austenitic stainless steel material.

13. A procedure chair comprising:
a backrest;
an adapter that extends from a top of the backrest; and
a headrest coupled to the adapter, wherein the headrest includes:
a headrest backing;
a cushion coupled to the headrest backing; and
a rail coupled to the headrest backing and configured to support a diagnostic device that generates a magnetic field,
wherein at least one component chosen from the rail and the adapter is formed from an austenitic stainless steel material to mitigate electromagnetic interference with the magnetic field.

14. The procedure chair according to claim 13, further comprising a mounting device removably coupled to the rail, wherein the mounting device is configured to couple the diagnostic device to the rail.

15. The procedure chair according to claim 14, wherein the mounting device comprises an articulating arm that is movable relative to the cushion according to at least four degrees of freedom.

16. The procedure chair according to claim 14, wherein the mounting device is positionable at a plurality of positions along a longitudinal axis of the rail.

17. The procedure chair according to claim 14, wherein the mounting device comprises a clamp with a gripping region having a shape that corresponds to a shape of a cross-section of the rail.

18. The procedure chair according to claim 14, wherein the rail is coupled to the headrest backing via one or more fasteners arranged between a first end of the rail and a second end of the rail, wherein the one or more fasteners extend from a bottom of the rail, and wherein the mounting device includes a clamp that defines an open region that facilitates sliding the clamp longitudinally across the rail, past the one or more fasteners.

19. The procedure chair according to claim 13, wherein the rail is coupled to a top side of the headrest backing, wherein the top side is configured to be closer to a top of a head of a patient than a bottom side of the headrest backing when the head of the patient rests against the cushion.

20. The procedure chair according to claim 19, wherein the rail extends from a first lateral side of the headrest backing to a second lateral side of the headrest backing.

21. The procedure chair according to claim 13, wherein the adapter is removable from the procedure chair.

22. A headrest comprising:
a headrest backing;
a cushion coupled to the headrest backing;
a rail coupled to the headrest backing and configured to support a diagnostic device that generates a magnetic field; and
an adapter coupled to the headrest backing and configured to couple to a procedure chair, wherein at least one component chosen from the rail and the adapter is formed from an austenitic stainless steel material to mitigate electromagnetic interference with the magnetic field, wherein the headrest backing comprises a top side, a bottom side, a first lateral side, and a second lateral side, wherein the rail is directly coupled to at least one of the top side, the first lateral side and the second lateral side, and wherein the adapter is directly coupled to the bottom side.

23. The headrest of claim 22,
wherein the top side is configured to be closer to a top of a patient's head than the bottom side when a back of the patient's head rests against the headrest, and
wherein the first lateral side and the second lateral side each extend (i) between the top side and the bottom side and (ii) on opposing sides of the headrest backing.

24. The headrest of claim 23, wherein the rail comprises:
a first rail coupled to the first lateral side of the headrest backing; and
a second rail coupled to the second lateral side of the headrest backing.

* * * * *